US006428602B1

(12) United States Patent
Rosenzweig et al.

(10) Patent No.: US 6,428,602 B1
(45) Date of Patent: Aug. 6, 2002

(54) METHOD FOR RECOVERING PLATINUM FROM PLATINUM-CONTAINING COATINGS ON GAS TURBINE ENGINE COMPONENTS

(75) Inventors: Mark A. Rosenzweig, Hamilton; Keith H. Betscher; Christopher J. Cunningham, both of West Chester; Howard J. Farr, Blue Ash, all of OH (US); Leo S. MacDonald, Petersburgh, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/495,267

(22) Filed: Jan. 31, 2000

(51) Int. Cl.⁷ .................................................. C22B 1/00
(52) U.S. Cl. ............................. 75/403; 75/426; 75/633; 75/715
(58) Field of Search .......................... 75/403, 426, 633, 75/715

(56) References Cited

U.S. PATENT DOCUMENTS 3,779,879 A   12/1973   Scott ........................... 204/146
4,246,083 A   1/1981   Notton ......................... 204/146
5,797,977 A * 8/1998   Narita .......................... 75/426
5,976,265 A * 11/1999  Sangeeta et al. ............... 134/3

FOREIGN PATENT DOCUMENTS

DE   3912126   10/1990

OTHER PUBLICATIONS

Derwent Abstract (Abstract DE 3912126) WPI AccNo 1990–321452/199043, Oct. 18, 1990.
Derwent Abstract AN 1992–390654[48], Oct. 29, 1991.

* cited by examiner

Primary Examiner—Melvyn Andrews
(74) Attorney, Agent, or Firm—V. Ramaswamy; Senniger, Powers, Leavitt & Roedel

(57) ABSTRACT

A method for recovering Pt from Pt-bearing coating on a gas turbine engine component. The component is contacted with a chemical stripping agent to dissolve away constituents of the coating and produce a Pt-bearing film of acid oxidation products at the surface of the component. The film is removed from the component to produce a Pt-rich residue containing at least about 10% Pt. The Pt-rich residue is collected and refined to recover Pt therefrom.

17 Claims, 1 Drawing Sheet

METHOD FOR RECOVERING PLATINUM FROM PLATINUM-CONTAINING COATINGS ON GAS TURBINE ENGINE COMPONENTS

BACKGROUND OF THE INVENTION

This invention relates to the recovery of Pt from gas turbine engine components in conjunction with the removal of Pt-containing coatings therefrom during repair and reworking.

Many advanced gas turbine engine components, especially turbine blades, are coated with platinum modified diffusion aluminide coatings (PtAl). These coatings offer superior environmental protection in oxidation and Type I hot corrosion conditions within a turbine engine. These coatings are also employed as bond coatings beneath physically vapor deposited (PVD) thermal barrier coatings.

The Pt present in PtAl coatings is most often deposited by electroplating. To develop the required PtAl chemistry and structure, about 0.5–0.8 grams of Pt are electroplated onto relatively smaller turbine blades, while up to on the order of 1.5 grams of Pt may be electroplated onto larger blades. After plating, the Pt is incorporated into the coating by diffusion, with the final composition of the predominant coating phase being (Ni,Pt)Al.

A PtAl coating may be removed from a blade if the coating itself or some other feature of the blade does not meet the engineering or quality requirements for the part. In such a case the coating is stripped, the part reworked and then recoated with PtAl. Turbine blades are also routinely stripped of PtAl coatings after engine operation to enable inspection and repair of the turbine blades.

Stripping of PtAl coatings is accomplished in a variety of manners. Most often the coatings are removed by acid stripping using mineral acids such as hydrochloric, phosphoric, nitric, and mixtures of these acids. The acids react with the coating and dissolve some of the coating constituents, especially Ni. After the reaction, a thin, loosely adherent, black film residue comprising Pt, aluminum oxides and heavy metal oxides of various elements from the substrate material is left behind on the blade. After stripping a number of parts, the stripping solutions become ineffective and must be discarded. Most often the acids are neutralized, the metals chemically precipitated out, and the precipitate filtered from the solution. The precipitate, although it contains minor amounts of Pt, is disposed of as solid waste in a landfill.

Residue has been removed from stripped turbine blades by mechanical methods such as wet blasting or vibratory finishing. Traditionally a "cutting" type media has been used in vibratory finishing machines to remove residue. Cutting media consist of abrasive aluminum oxide particles in a soft binder. The binder breaks down, releasing aluminum oxide particles into the vibratory finish machine. Large volumes of sludge are produced. The residue is thus contaminated and diluted by the abrasive media as it breaks down, such that the Pt is no longer economically recoverable. Overflow from wet blast or vibratory finishing machines used to clean blades is treated in a wastewater system, and the solids, although they contain Pt, are disposed of as waste.

In situations where PtAl coatings are removed mechanically by abrasive grit blasting, rather than chemically, Pt-bearing debris from grit blasting is filtered from the process air and is disposed of as solid waste.

By one of the above processes, the Pt from the PtAl stripping operation finds its way into the final waste stream of a turbine blade repair plant. Many high volume operations feed into the final waste stream in a manufacturing plant and dilute the concentration of Pt in the solid waste to the point where it is not economically viable to recover the precious metal.

BRIEF SUMMARY OF THE INVENTION

The invention is directed to a method for recovering Pt from a Pt-bearing coating on a gas turbine engine component. The component is contacted with a chemical stripping agent to dissolve away constituents of the coating and produce a Pt-bearing film of acid oxidation products at the surface of the component. The film is removed from the component to produce a Pt-rich residue containing at least about 10% Pt and the residue is refined to recover Pt therefrom.

Other features of the invention will be in part apparent and in part pointed out hereinbelow.

DETAILED DESCRIPTION OF THE INVENTION

Figure 1:
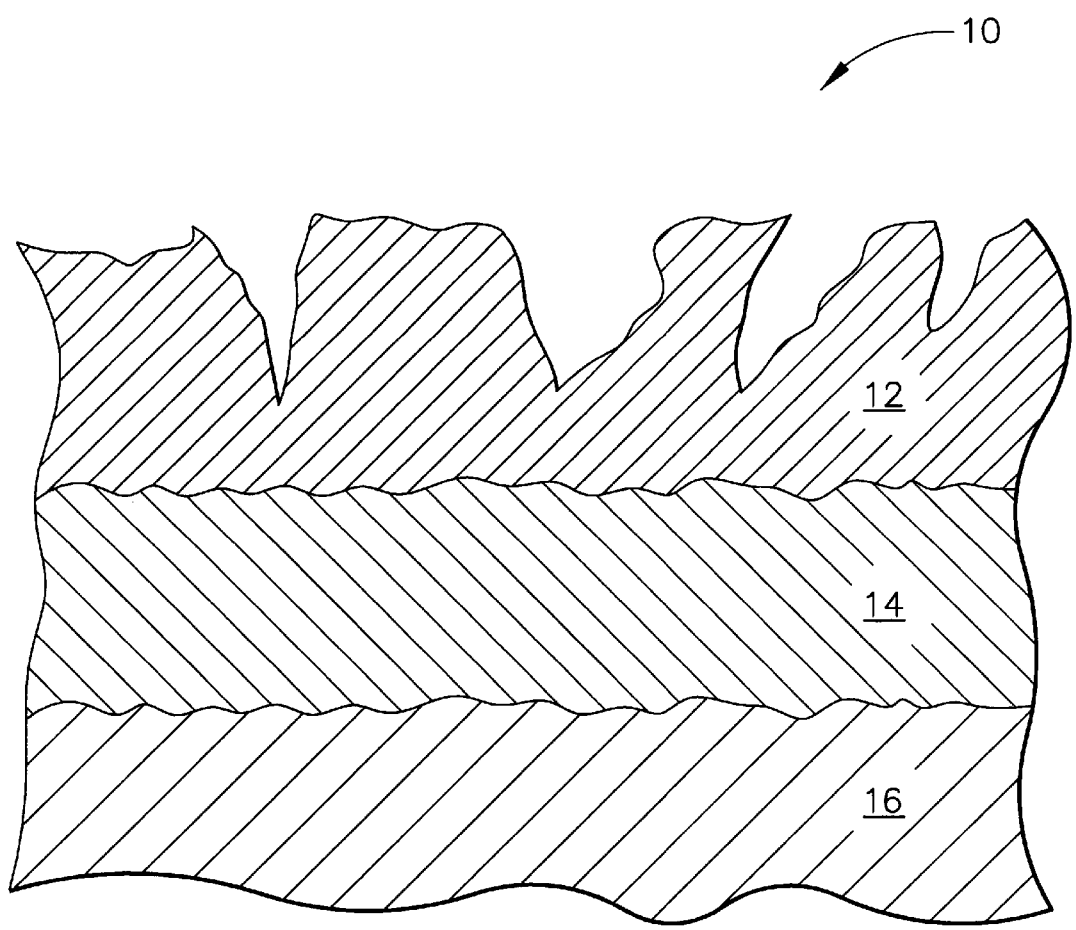
FIG. 1 is a schematic cross section of turbine blade after acid stripping of a PtAl coating thereon.

In accordance with this invention the location of Pt stripped from turbine blades is identified early in the blade repair process prior to dilution of the Pt to a degree where it cannot be recovered economically. In particular, the chemical stripping process yields two distinct by-products, a stripping solution containing dissolved metals and residue on the blades. This invention determines whether economically recoverable Pt values, e.g., values on the order of at least about 10% by weight, preferably at least about 20% by weight, are present in the solution, the residue, or both. In particular, as detailed in Example 1 below, economically recoverable Pt values concentrated in the residue but not in the solution.

The invention further involves stripping turbine blades, preferably by an acid-stripping method employing acids selected from the group comprising hydrochloric, phosphoric, nitric, other acids and mixtures thereof. One preferred embodiment employs the stripping methods disclosed in U.S. Pat. No. 5,976,265 and/or U.S. patent application Ser. No. 09/303,755, filed Apr. 28, 1999, entitled "Method For Removing an Aluminide Coating From A Substrate," the entire disclosures of which are expressly incorporated herein by reference. After stripping, the Pt-rich residue of aluminum oxide, heavy metal oxides, and other by-products from the acidic oxidation are recovered without dilution or contamination by other solid material. In one embodiment of the invention, the residue is recovered by hand brushing or scrubbing. Hand brushing is accomplished using either a nylon or wire bristle brush. The blades can be brushed while still wet after rinsing from the strip operation. The blades are scrubbed over a collecting tank in which the residue is captured. The residue is removed from the water in the collecting tank by evaporation, settling, or filtration. Alternatively, the blades are dried and the residue brushed off over a tray or other suitable container. Hand brushing may not amenable to a high volume manufacturing plant, except in regions with low labor costs.

An alternative embodiment of the invention involves high pressure water blasting accomplished by enclosing the blades in a water tight chamber and directing a high pressure water stream at the blades. The water pressure is in the range of 100–4000 psi in order to remove the residue. Residue from the blades is separated from the process water by evaporation, settling tank, or filtration.

A further alternative embodiment of the invention involves ultrasonic water rinsing to dislodge the residue from the blades. The water preferably has a low concentration of added wetting agent to improve the effectiveness of the cleaning. Ultrasonic transducers of 20–80 MHz frequency are preferred to induce cavitation within the solution, which produces effective cleaning action. The dislodged residue is separated from the process water by evaporation, settling tank, or filtration.

In the most preferred variation of the invention, residue is removed from the blades by vibratory finishing with a non-degradable media. This is accomplished, for example, by use of a machine available from Sweco Inc. of Florence, Kentucky. Media which do not break down and produce large volumes of sludge are preferred. These media include polyurethane rubber and sintered ceramic media such as porcelain. Water is slowly and continuously added while vibratory finishing. A wetting agent or detergent is optionally added to improve cleaning effectiveness. The water and residue continuously drain from the vibratory finishing machine. The residue from the blades is then separated from the process water by evaporation, settling tank, or filtration.

Once the residue is captured in a dry form by one of the aforementioned methods, the residue is sent to a precious metal recycling plant for Pt recovery by standard pyrometallurgical or hydrometallurgical refining techniques.

EXAMPLE 1

A production lot of 22 engine run turbine blades was stripped using a mixture of 50% nitric and 50% phosphoric acids by volume at 170° F. After stripping these blades, the stripping solution was analyzed by inductively coupled plasma atomic emission spectroscopy for dissolved Pt, and the residue was scraped from the blades and analyzed for Pt by X-ray methods. The results showed that the solution contained only about 0.5 ppm weight Pt while the residue contained about 40% by weight Pt. FIG. 1 is a schematic presentation of a photomicrograph which was taken of a cross-section of the surface of one of the blades 10. The superalloy substrate 16 has thereon a residue comprising a relatively Pt-rich region 12 on top of a region 14 having relatively less Pt. From this novel characterization of the Pt-rich residue it can be seen that Pt concentrates into the residue during the chemical stripping operation.

EXAMPLE 2

Fifty turbine blades were stripped in a nitricphosphoric acid solution. After rinsing, the parts were dried with the residue remaining on the parts. An operator used a wire bristle brush and by hand-scrubbing removed the residue which was captured and analyzed. A total of about 5.1 grams of dried residue was obtained with a Pt concentration of 40% by weight. This represents 0.04 grams Pt per blade which is a very low yield, assuming each blade originally contained 0.5–1.0 grams of Pt.

This method was repeated with five turbine blades. A total of 2.3 grams of residue with a concentration of 32% by weight Pt was obtained from these 5 blades. Again this was found to be a low yield of only 0.15 grams of Pt per blade. Much of the residue could either not be removed by hand brushing (the blades remained black even after brushing) or the residue was lost as dust in the air or on the operator's hands, clothing, or equipment. Given the variability and lost Pt, hand scrubbing is not the most preferred method to recover Pt containing residue.

EXAMPLE 3

Forty-nine blades were stripped in a methanesulfonic acid solution according to the methods disclosed in U.S. Pat. No. 5,976,265 and U.S. application Ser. No. 09/303,755, referenced above. The blades were then rinsed with water plus 0.5% of a wetting agent, the wetting agent comprising a mixture of octylphenolpolyoxyethanol and polyethylene glycol (trade name TRITON X-100 available from the Rohm and Haas Company of Philadelphia, Pa.) in an ultrasonic tank for 30 minutes. The rinse water was recirculated through a 3-micron filter cartridge. After processing the parts, the dried filter weighing about 500 grams total was analyzed and found to contain 3.5% by weight Pt. This represents a yield of about 0.36 grams of Pt per blade.

The ultrasonic rinse operation was scaled up to a production sized tank. An 80 gallon tank was filled with water and 0.1% of a polyethylene glycol surfactant. The tank was designed to hold baskets of 40–80 blades at a time. The parts were immersed for 30 minutes with 40 KHz ultrasonic agitation. After cleaning the blades, an air diaphragm pump flowed solution through a 3-micron polypropylene cartridge filter. A total of one month's production blades (approximately 1000) were run through the ultrasonic tank. After one month, the filter cartridge was removed from the system and dried. Analysis showed that the filter contained about 0.55% by weight Pt. This is a yield of only about 2.0–3.0 grams of Pt recovered from the 1000 parts. The ultrasonic rinsing method did not appear to be viable using the existing production equipment. It was concluded that modifications to the ultrasonic equipment may improve Pt recovery yields.

EXAMPLE 4

Eleven blades were stripped in a hydrochloric acid solution. After stripping, the blades were rinsed with water and then mass-finished in a one cubic foot vibratory finishing machine with a 1178 rpm motor producing 3 inch vertical and ⅛ inch horizontal motion. The machine contained a cone-shaped non-degradable porcelain media (designated FB 9/16 CN available from Sweco, Inc. of Florence, Ky.). Water was continuously added to the machine at the rate of five gallons per hour. The blades were processed for 15 minutes after which the parts were metallic in appearance without any residual residue. The overflow water from the vibratory machine was captured in a container. The black solids were permitted to settle in the container, the water was decanted, and the solids were oven-dried. The weight of solids was 12.32 grams, with roughly 25% by weight of the solids being Pt. This represents a yield of 0.28 grams of Pt per blade, which is roughly equal to half the Pt metal content assumed to be on the blades. The 11 blades themselves had a weight loss of 10.97 grams through this operation. The 1.35 grams difference between weight of collected solids and weight loss of the blades is the mass of finishing media that broke down during the process, which is lower than would be expected with traditional "cutting" type media. Based upon these results, the vibratory finishing method has been determined to be the most economically viable process, since it produced the greatest yield with minimal contamination and dilution.

As various changes could be made in the above methods without departing from the scope of the invention, it is intended that all matter contained in the above description or shown in the accompanying drawing shall be interpreted as illustrative and not in a limiting sense.

What is claimed is:

1. A method for recovering Pt from Pt-bearing coating on a gas turbine engine component, the method comprising:

contacting the component with a chemical stripping agent to dissolve away constituents of the coating and produce a Pt-bearing film of one or more acid oxidation products at the surface of the component;

removing the film from the component to produce a Pt-rich residue containing at least about 10% Pt;

collecting the residue; and refining the residue to recover Pt therefrom.

2. The method of claim 1 wherein removing the film from the component is accomplished by hand brushing over a collection vessel to dislodge the film from the component and collect said Pt-rich residue in the collection vessel.

3. The method of claim 1 wherein removing the film from the component is accomplished by directing a high pressure water stream at the components in a water tight chamber to dislodge the film from the component and produce a Pt-rich residue in a slurry consisting of the residue in water from the high pressure water stream, the method further comprising separating said residue from said water prior to refining the residue to recover Pt therefrom.

4. The method of claim 1 wherein removing the film from the component is accomplished by ultrasonic water rinsing to dislodge the film from the component and produce a Pt-rich residue in a slurry consisting of the residue in water, the method further comprising separating said residue from said water prior to refining the residue to recover Pt therefrom.

5. The method of claim 1 wherein removing the film from the component is accomplished by vibratory finishing in water to dislodge the film from the component and produce a Pt-rich residue in a slurry comprising the residue in water, the method further comprising separating said residue from said water prior to refining the residue to recover Pt therefrom.

6. The method of claim 5 wherein said vibratory finishing is accomplished using a media selected from the group consisting of polyurethane rubber media and ceramic media.

7. A method for recovering a Pt-rich residue from a Pt coating on a gas turbine engine component, the method comprising:

contacting the component with a chemical stripping agent to dissolve away constituents of the coating and produce a Pt-bearing film of acid oxidation products at the surface of the component;

removing the film from the component to yield a Pt-enriched residue containing at least about 10% Pt.

8. The method of claim 7 wherein removing the film from the component is accomplished by a method selected from the group of methods consisting of hand brushing, high pressure water blasting, ultrasonic cleaning, and vibratory finishing.

9. A method for recovering Pt from Pt-bearing coating on a gas turbine engine component, the method comprising:

contacting the component with a chemical stripping agent to dissolve constituents of the coating and produce a leachate containing said dissolved constituents and a film of acid oxidation products at the surface of the component;

determining the Pt content of the leachate and of the film;

recovering Pt-bearing residue from whichever of the leachate and the film has the higher Pt content; and refining the residue to recover Pt therefrom.

10. The method of claim 9 wherein removing the film from the component is accomplished by a method selected from the group of methods comprising hand brushing, high pressure water blasting, ultrasonic cleaning, and vibratory finishing.

11. A method for recovering Pt from Pt-bearing coating on a component, the method comprising:

dissolving at least a portion of the coating to provide a Pt-bearing film;

removing the film from the component to produce a Pt-rich residue containing at least about 10% Pt; and recovering Pt from the residue.

12. The method of claim 11 further comprising directing a high pressure water stream at the components to dislodge the film from the component.

13. The method of claim 11 further comprising the use of ultrasonic energy to dislodge the film from the component.

14. The method of claim 11 further comprising the use of vibratory finishing in water to dislodge the film from the component.

15. The method of claim 14 wherein said vibratory finishing is accomplished using a media selected from the group consisting of polyurethane rubber media and ceramic media.

16. The method of claim 11 wherein the step of dissolving at least a part of the coating comprises contacting the component with a chemical stripping agent.

17. The method of claim 16 further comprising the use of vibratory finishing with media selected from the group consisting of polyurethane rubber media and ceramic media.

* * * * *